United States Patent
Hoglund et al.

(10) Patent No.: US 6,829,480 B1
(45) Date of Patent: Dec. 7, 2004

(54) MOBILE STATION SUPPORTED PRIVATE SYSTEM ROAMING

(75) Inventors: Mats Vilhelm Hoglund, Järfälla (SE); Dave Larson, Cary, NC (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/474,950

(22) Filed: Dec. 30, 1999

(51) Int. Cl.⁷ ................................................ H04Q 7/20
(52) U.S. Cl. ................ 455/433; 434/426.2; 434/422.1; 434/435.1; 434/555; 370/328; 370/401
(58) Field of Search ............................... 455/422.1, 433, 455/424, 425, 426.1, 426.2, 448, 428, 432.1, 435.1, 453.3, 440, 456.1, 462, 552.1, 554.1–555, 411–410, 41.2, 519; 370/328, 466, 356, 475, 401, 229; 709/249

(56) References Cited

U.S. PATENT DOCUMENTS

| 5,670,950 | A | * | 9/1997 | Otsuka | 455/411 |
| 5,745,852 | A | * | 4/1998 | Khan et al. | 455/433 |
| 5,818,824 | A | * | 10/1998 | Lu et al. | 370/328 |
| 5,905,953 | A | * | 5/1999 | Liu et al. | 455/433 |
| 6,073,023 | A | * | 6/2000 | Tirabassi et al. | 455/518 |
| 6,075,783 | A | * | 6/2000 | Voit | 370/352 |
| 6,411,632 | B2 | * | 6/2002 | Lindgren et al. | 370/466 |
| 6,539,237 | B1 | * | 3/2003 | Sayers et al. | 455/555 |

FOREIGN PATENT DOCUMENTS

WO   WO 97/42781   11/1997

OTHER PUBLICATIONS

International Search Report, PCT/US00/42602, Aug. 17, 2001.

* cited by examiner

Primary Examiner—Jean Gelin
Assistant Examiner—Kamran Afshar
(74) Attorney, Agent, or Firm—Myers Bigel Sibley & Sajovec

(57) ABSTRACT

A mobile communication unit for a private system including a transceiver adapted to communicate with a plurality of private wireless office systems, a memory storing user group information, and a processor adapted to selectively initiate transmission of the user group information in the memory by the transceiver. The user group information identifies a location register storing information relating to access rights of the mobile communication unit on the private wireless office system with which the transceiver is then communicating, and transmission of the user group information initiates determination of access rights with the private wireless office system with which the transceiver is then communicating.

24 Claims, 4 Drawing Sheets

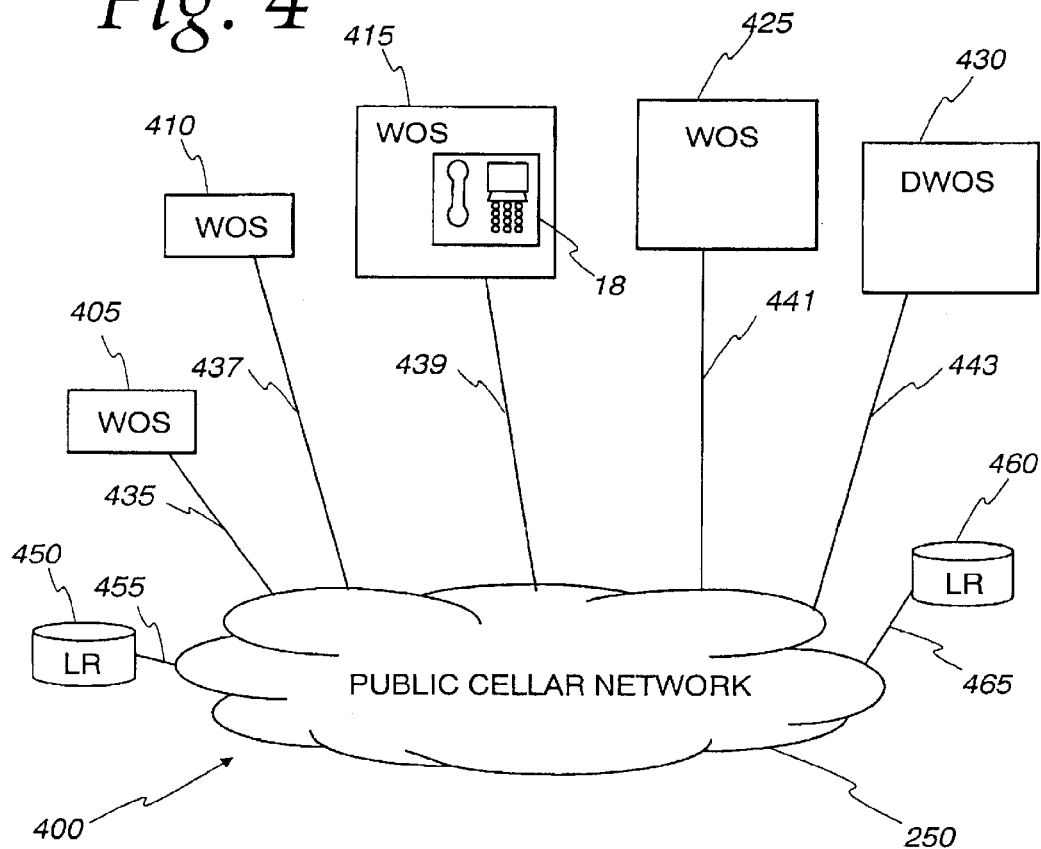
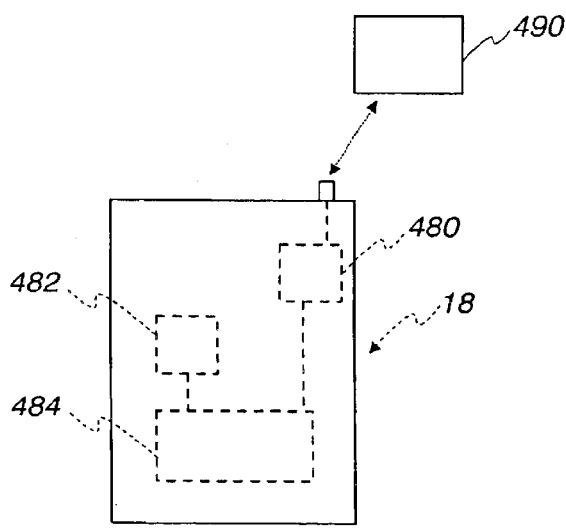

MOBILE STATION SUPPORTED PRIVATE SYSTEM ROAMING

BACKGROUND OF THE INVENTION

This invention relates to cellular communication systems. Specifically, the invention is directed to mobile station supported private system roaming.

A description of cellular radio systems is found in *Cellular Radio Systems*, published by Artech House, Boston (editors: D. M. Balston and R. C. V. Macario; ISBN: 0-89006-646-9); *Digital Cellular Radio* written by G. Calhoun and published by Artech House, Boston (ISBN: 0-89006-266-8); and TIA IS-136 air interface standard ("IS-136"). *Cellular Radio Systems, Digital Cellular Radio*, and IS-136 are hereby incorporated by reference in their entirety.

A cellular mobile telecommunications system includes a mobile communication unit or mobile station communicating with any one of a plurality of geographically spaced base stations. Broadly, each base station defines a cell, and each cell forms an integral part of a larger cellular network. The size of a cell largely depends on the power rating of the corresponding base station. The base stations communicate with a mobile switching station by means of intercellular trunk lines. The mobile switching center determines which of the base stations and channels should process a call with the mobile station based on considerations such as signal strength between each available channel and the mobile station.

A mobile station can also communicate with a private system such as a digital wireless office system. A digital wireless office system provides an extension to the private branch exchange ("PBX"). The mobile station can, for example, communicate with the private system based on the ANSI-136 standard. The ANSI-136 standard is hereby incorporated by reference in its entirety. The terms "private system" and "private communication system" will hereafter be regarded as equivalent terms.

A mobile station can roam between private systems. Specifically, a mobile station can roam between a private system and the public cellular system using an ANSI-41 connection. A mobile station can also roam directly between private systems, and indirectly by roaming from a first private system into the public system and then into a second private system.

Problems can arise when a private system lacks information on a user. Information about a user, such as a user's profile and location, can be kept in a location register ("LR") such as a Home Location Register ("HLR") on a Public Land Mobile Network ("PLMN"). However, private systems are not able to access user information stored on a public land mobile network HLRs, and public land mobile network HLRs generally do not store information about private systems. Such information is necessary to determine whether the mobile station should be offered service for the automatic routing of calls of that private system. Centralized or distributed private database solutions that offer user information may require administration of routing on a per user basis. Thus, centralized or distributed private database solutions would incur a considerable overhead and set up costs.

The present invention is directed toward overcoming one or more of the problems set forth above.

SUMMARY OF THE INVENTION

In one aspect of the present invention, a mobile communication unit for a private system is provided including a transceiver communicating with a plurality of private wireless office systems of a private network, a memory storing user group information, and a processor selectively initiating transmission of the user group information in the memory by the transceiver. The user group information identifies a location register storing information relating to access rights of the mobile communication unit on the private wireless office system with which the transceiver is then communicating, and transmission of the user group information initiates determination of access rights with the private wireless office system with which the transceiver is then communicating.

The location register may be a remote private location register; and the user group information in the memory may be a mobile switching center identification of the private location register.

A remote private location register may store the information relating to access rights at an Internet address, with the user group information in the mobile communication unit memory being the Internet address of the private location register.

The user group information may be an identification transmitted by the transceiver, with a private translation table correlating the identification with the location register.

The processor may also initiate transmission of the user group information to the one private wireless office system with which the transceiver is then communicating only upon receipt by the transceiver of a signal indicating that the one private wireless office system with which the transceiver is then communicating supports use by private system mobile communication units. Also, the processor may block transmission of the user group information to the one private wireless office system with which the transceiver is then communicating upon receipt by the transceiver of a signal indicating that the private wireless office system with which the transceiver is then communicating does not support use by private system mobile communication units.

In another aspect of the present invention, a communication system for a private system is provided, including first and second spatially separated private wireless office systems covering first and second areas, a mobile station, a private location register ("PLR") at a selected location storing access right information for the mobile station, and a communication network between the private wireless office systems and the PLR. The user group information identifies the selected location. The mobile station has a transceiver communicating with the private wireless office system covering the area in which the mobile station is located, a memory storing user group information relating to the mobile station, and a processor selectively initiating transmission by the transceiver of the user group information in the memory to the private wireless office system covering the area in which the mobile station is located.

The communication network may be the Internet with the user group information an Internet address for the private location register on the Internet.

Further, the communication network may identify each private wireless office system by a Mobile Switching Center Identification (MSCID), with one of the first and second private wireless office systems having the private location register and the user group information being the MSCID for the private wireless office system which has the private location register.

Translation tables at each base station may map the user group information to the private location register storing access right information for the mobile station.

In still another aspect of the present invention, a method for registering a mobile station having a home private wireless office system with a visited private wireless office system is provided, comprising the steps of transmitting user group information by the mobile station to the visited private wireless office system when initiating registration of the mobile station with the visited private wireless office system (the user group information identifying the home private wireless office system), requesting information regarding service access of the group from a private location register of the home private system responsive to receipt of the user group information at the visited private wireless office system, providing the requested information regarding service access of the group from the private location register of the home private wireless office system to the visited private wireless office system, and providing service access to the mobile station in the visited private wireless office system in accordance with the information regarding service access of the group.

The step of requesting information regarding service access of the group from the private location register at the home private wireless office system may comprise translating the user group information to the private location register, and accessing the information regarding service access of the group at the private location register of the home private wireless office system.

The step of transmitting user group information by the mobile station to the visited private wireless office system when initiating registration of the mobile station with the visited private wireless office system may be done only if it is determined that the mobile station is not initiating registration with the home private wireless office system. Further, an indication may be transmitted by the visited private wireless office system that it supports communication with mobile stations registered with private system networks, with transmitting user group information by the mobile station to the visited private wireless office system when initiating registration of the mobile station with the visited private wireless office system not being done unless the mobile station receives the indication.

Transmitting user group information by the mobile station to the visited private wireless office system when initiating registration of the mobile station with the visited private wireless office system may consist of transmitting a user group ID.

The private location register may be at an Internet address, with the step of requesting information regarding service access of the group from the private location register comprising requesting information regarding service access of the group over the Internet from the Internet address, and the step of providing the information regarding service access of the group from the private location register at the home private wireless office system to the visited private wireless office system comprising providing the information regarding service access of the group over the Internet from the Internet address.

The private location register may be identified by a Mobile Switching Center Identification (MSCID); with the step of requesting information regarding service access of the group from the private location register comprising addressing a request for information regarding service access of the group with the MSCID, and sending the request for information addressed with the MSCID to the private location register identified by the MSCID.

The user group information may be mapped in a translation table for identifying the home private wireless office system, with the step of requesting information regarding service access of the group from the private location register comprising mapping the user group information on the translation table to identify the home private wireless office system, and requesting information regarding service access of the group from the private location register identified by mapping the user group information on the translation table.

BRIEF DESCRIPTION OF THE DRAWINGS

FIG. 4 is a perspective view of a network comprising of a private system and a public network system according to one aspect of the invention; and FIG. 5 is a simplified schematic illustration of a mobile communication unit according to the present invention.

DETAILED DESCRIPTION OF THE INVENTION

While the invention will be described in connection with one or more embodiments, it will be understood that the invention is not limited to those embodiments. On the contrary, the invention includes all alternatives, modifications, and equivalents as may be included within the spirit and scope of the appended claims.

Figure 1:
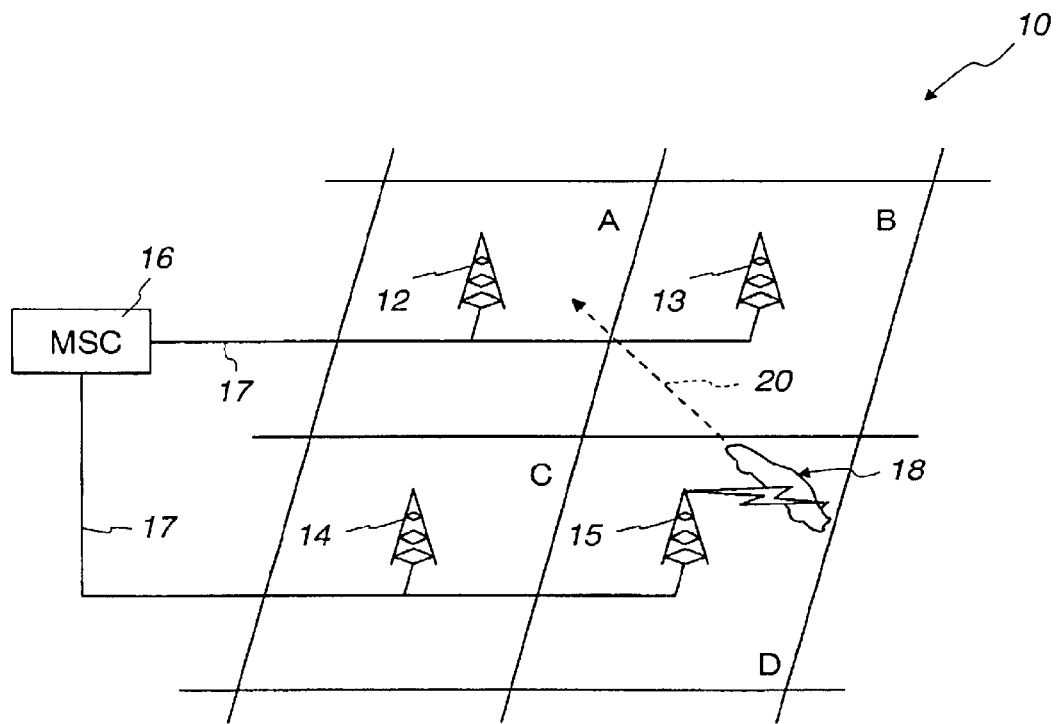
FIG. 1 is a perspective view of a cellular mobile telecommunication system according to the prior art.

Referring initially to FIG. 1, a public cellular system 10 of conventional construction is illustrated. The cellular system 10 is defined by plural cells, including representative cell locations A, B, C and D. Each cell A–D includes a respective base station 12, 13, 14, and 15. Each of the base stations 12–15 communicates with a mobile switching center 16 via intercellular trunks 17. A mobile communication unit or mobile station, represented at 18, may consist of, for example, a cellular phone, carried by a user in an automobile. However, as is apparent, the mobile station may comprise any known form of mobile station capable of communicating with a public cellular system 10.

The public cellular system 10 is operable to select from one of the base stations 12–15 to process a call with mobile station 18. As illustrated, the mobile station 18 is located in cell location D. Consequently, a cellular channel associated with base station 15 would handle the call in progress. If the mobile station 18 were stationary, then the call would likely be handled until completion by the base station 15. However, if the mobile station is moving, then it could cross into different cells. For example, as illustrated, the mobile station 18 might be moving in a direction as indicated by the dashed line 20 and traverse into cell location B and subsequently cell location A. A typical cellular mobile telecommunication system 10 utilizes handoffs to hand a call off from a channel of the base station 15 to a channel of the base station 13, and subsequently from the base station 13 to the base station 12, as the mobile station traverses from cell location D to respective cell locations B and A.

A mobile station can also roam from the public cellular system into a private system such as a Wireless Office System ("WOS") including Digital Wireless Office Systems ("DWOS"). Specifically, a mobile station can roam between the public cellular system and a private system using an ANSI-41 connection. A mobile station can also roam directly between private systems, and indirectly by roaming, for example, from a first private system into the public cellular system and then into a second private system.

Figure 2:
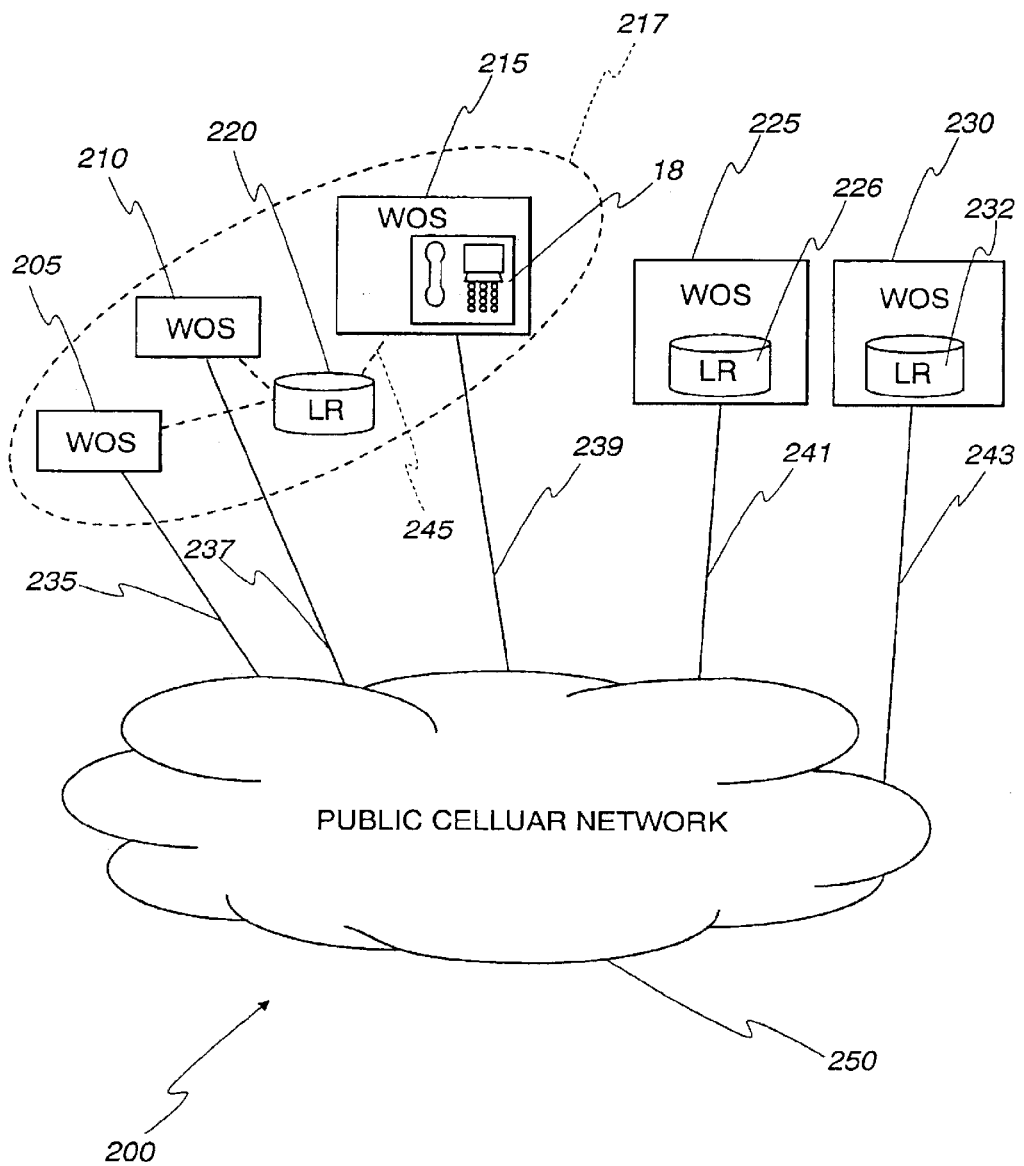
FIG. 2 is a diagram of a network comprising of a private system and a public network system according to the prior art.

FIG. 2 shows a prior art schematic 200 of three Wireless Office Systems ("WOSs"), 205, 210, and 215, sharing one Location Register ("LR") 220 thereby defining domain 217; two Wireless Office Systems, 225 and 230, with independent Location Registers, 226 and 232; lines of communication (shown as a solid line), 235, 237, 239, 241, and 243, between a public cellular network 250 and the Wireless Office Systems 205, 210, 215, 225, and 230; and lines of communication 245 (shown as dashed line) between the shared Location Register 220 and the Wireless Office Systems 205, 210 and 215. A user with a mobile station 18 operating in the public cellular network 250 may roam into one of the Wireless Office Systems, 205, 210, or 215 inside domain 217. In this schematic, the mobile station 18 has roamed into the Wireless Office System 215. Wireless Office System 215 can only obtain information on the mobile station 18 if the mobile station's information is stored on the shared Location Register 220. Likewise, Wireless Office System 205 and 210 can only obtain information on the mobile station 18 if the mobile station's information is stored on the shared Location Register 220. If the mobile station 18 roamed into Wireless Office System 225 or 230, then neither private system can obtain information on the mobile station 18 if it is not stored on the local Location Register 226 and 232, respectively.

Figure 3:
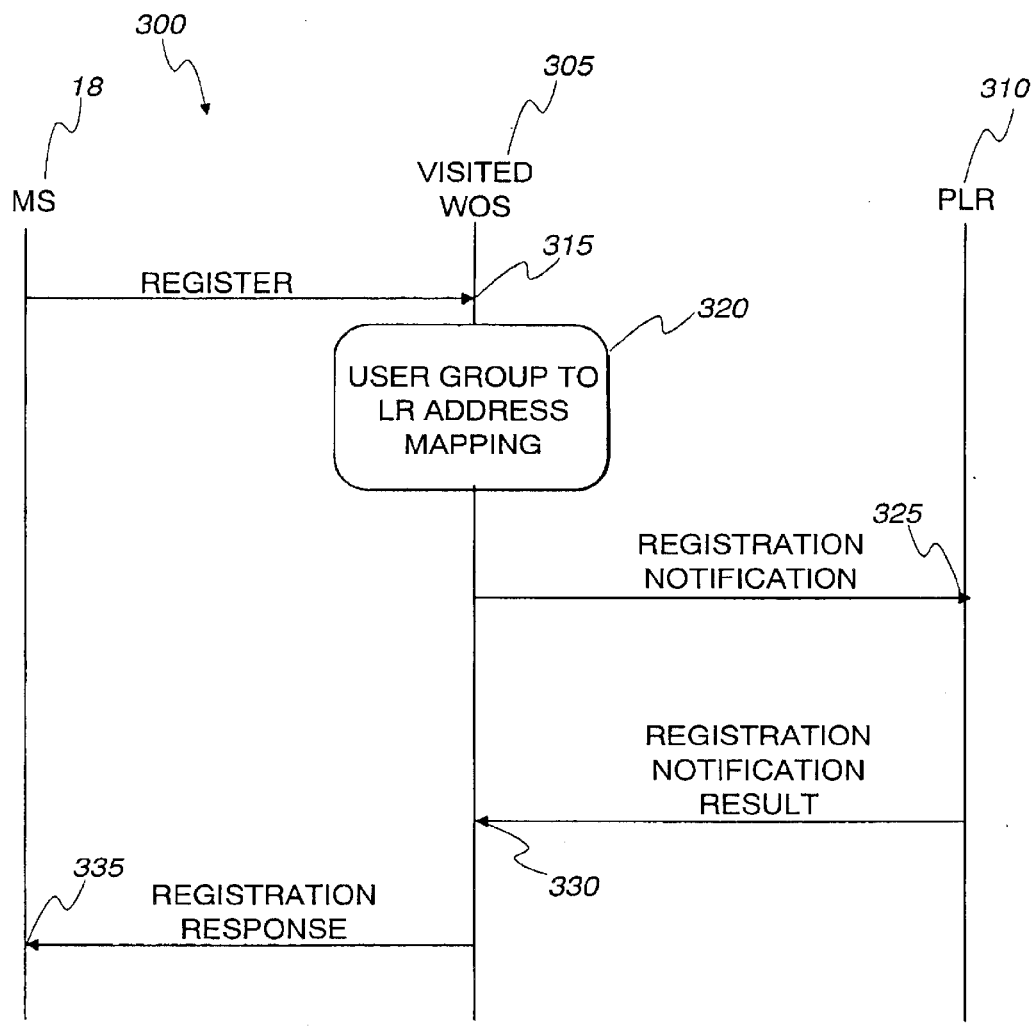
FIG. 3 is an interaction diagram illustrating a mobile supported system registration according to one aspect of the invention.

Referring to FIG. 3, which is an interaction diagram 300 illustrating a mobile station supported system registration according to one aspect of the invention; the mobile station ("MS") 18 roams into a Wireless Office System ("Visited WOS") 305. The mobile station 18 transmits a registration message at 315, which is received by the Wireless Office System 305. For example, in transmissions sent according to the ANSI-136 standard, a slot for User Group ID is not currently known to be used and therefore is available to use in transmitting user group information according to the present invention. However, it should be recognized that the present invention encompasses any suitable transmission of the user group information, and is not to be limited to one signal standard.

The Wireless Office System 305 is configured with address translation information which enables the Wireless Office System 305 to perform "user group to Location Register mapping" at 320 using the user group information contained in the registration message transmitted by the mobile station 18. Specifically, upon roaming into a private system, here a private visited Wireless Office System ("WOS") 305, the mobile station 18 registers at 315 with the visited Wireless Office System 305.

During registration in accordance with the present invention, the mobile station 18 supplies its user group information to the Wireless Office System 305 as indicated above. However, it should be recognized that the mobile system 18 will not necessarily supply its user group information to every system with which it attempts to register. For example, private wireless office systems may be set up to transmit a signal to mobile stations which enter their covered area indicating that the system covering that area supports communication with mobile stations 18 from private wireless office systems. The mobile station 18 may be programmed to transmit its user group information only upon receipt of such a signal from the system covering the area in which it is then located and potentially about to register with. Further, the private wireless office systems may be set up to transmit a signal identifying itself, with the mobile station 18 programmed to recognize the identifying signal of its home wireless office system, in which case the mobile station 18 would also not unnecessarily transmit its user group information.

When the user group information is transmitted by the mobile station 18 (e.g., when located in an area which is covered by a private wireless office system with which registration is also possible as noted above), at 320 the Wireless Office System 305 utilizes the address translation information (such as a translation table) to map the user group information to the address of the Private Location Register 310 that stores the mobile station's information (typically at a location remote from the visited Wireless Office System 305, such as at the mobile station's home wireless office system). Such translation provides security by limiting the usable information which might be transmitted over the air in wireless systems. However, it should be noted that it would be within the scope of the present invention to transmit sufficient information so that such mapping/translation is not required such as is alternatively described below.

The Wireless Office System 305 then sends a registration notification request to the Private Location Register 310. Upon receiving the registration notification request at 325, the Private Location Register performs verification and replies with a registration notification result that is received by the Wireless Office System at 330. The Wireless Office System sends an appropriate registration response that is received by the mobile station at 335. The mobile station 18 is now validated to use the resources of the Wireless Office System 305.

The Wireless Office System 305 may also register the mobile station 18 with a public network in a suitable manner if desired.

FIG. 5 schematically illustrates the mobile station 18 according to the present invention in simplified form. The mobile station 18 includes a transceiver 480 for transmitting and receiving signals. Most commonly, the transceiver 480 would be wireless and communication by radio signals, although it should be understood that the invention would broadly also encompass a fixed wire system in which the mobile station 18 is transportable but also connected via fixed wire to the local private system to which it is transported. The mobile station 18 also includes a memory 482 in which is stored the user group information, and a processor 484 for transmitted and received signals which, inter alia, selectively initiates transmission of the user group information in the memory 482 by the transceiver 480 for determining access rights with the private system (e.g., a local private wireless office system 490) with which the transceiver 480 is then communicating.

It should be understood that the registration message could optionally contain a mobile switching center identification number ("MSCID") of a Wireless Office System with a link to a private Location Register containing information on the user. In this aspect of the invention, the visited Wireless Office System 305 bypasses the address mapping translation step such as previously noted and instead forwards a registration notification directly to the mobile switching center and then onto the private Location Register. The private Location Register replies with a registration notification result routed to the visited Wireless Office System, providing the visited Wireless Office System with information relating to the access rights of the mobile station 18 (e.g., a service profile for the mobile station including an identification of which services are to be made available to the mobile station by the visited Wireless Office System). On receiving the information about the mobile station 18 from the private Location Register, the visited Wireless Office System sends a registration response to the mobile station.

It should be understood that the mobile station 18 supplies the visited private Wireless Office System with sufficient information during registration to enable the visited private Wireless Office System to locate (either directly, e.g., by use of an MSCID, or indirectly, e.g., by use of a translation table mapping the user group information to the private Location Register) necessary information relating to the user or subscriber of the mobile station. Thus, it is not essential that the visited private wireless office system perform an address mapping translation. In particular, this invention is directed to a mobile station capable of visiting private wireless office systems which lack a local Location Register containing information on the user or subscriber of the mobile station visiting the private system.

In another aspect of the invention, the user group information may be a separate information element for home system addressing (which can have the same format as an Internet Protocol [IP] address), which information is introduced into the air interface protocol. In the preferred form, this is accomplished by first assigning a home system address to a mobile station to enable intersystem communication over a fixed network. An information element is introduced in the mobile station's private system ID field to instruct the mobile station as to whether or not to include the mobile station's home system address in the registration message. Thereafter, whenever the mobile station registers with a private wireless office system that has been marked in the information element as not requiring the home address in the registration message (or as the home Wireless System itself), the mobile station will not transmit the home address when registering. Conversely, the mobile station will transmit the home address when registering with private systems for which the information element contains no such marking. With this separate information element, user groups can be used according to IS-136 without any co-ordination of user group IDs and fixed network addresses. Specifically, efficiency is maintained particularly when the mobile station is registering with its home system.

Referring to FIG. 4, which shows a schematic 400 according to one aspect of the invention, the mobile station 18 can roam into any of the illustrated private systems that include Wireless Office Systems 405, 410, 415 and 425 and a Digital Wireless Office System 430. Communication lines 435, 437, 439, 441, and 443 enable the private systems to communicate with the public cellular network 250 and beyond. Specifically, the mobile station 18 is shown visiting the Wireless Office System 415, which lacks a direct communication link with a remote private Location Register containing the user information. Upon roaming into private wireless office system 415, the mobile station 18 registers with the private wireless office system 415 and facilitates this private system in accessing user information from a remote Location Register. Thus, if the user information happens to be stored on Location Register 460, the mobile station 18 includes sufficient information in its registration message to enable the private system 415 to route a registration notification message to the Location Register 460 and efficiently retrieve the required information. Such routing can occur through the public cellular network 250 shown, or through other communication networks such as the Internet or an intranet.

While the invention is described above in connection with preferred or illustrative embodiments, these embodiments are not intended to be exhaustive or limiting of the invention. Rather, the invention is intended to cover all alternatives, modifications and equivalents included within its spirit and scope of the invention, as defined by the appended claims. Further, still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

What is claimed is:

1. A mobile communication unit for a private system, comprising:
   a transceiver adapted to communicate with a plurality of private wireless office systems of a private network;
   a memory storing user group information identifying a location register storing information relating to access rights of said mobile communication unit on one of said plurality of private wireless office systems with which said transceiver is then communicating; and
   a processor selectively initiating transmission of said user group information in said memory by said transceiver for determining access rights with said one private wireless office system with which said transceiver is then communicating.

2. The mobile communication unit of claim 1, wherein:
   said location register comprises a remote private location register; and
   said user group information in said memory comprises a mobile switching center identification of said private location register.

3. The mobile communication unit of claim 1, wherein:
   said location register comprises a remote private location register at an Internet address; and
   said user group information in said memory comprises said Internet address of said private location register.

4. The mobile communication unit of claim 1, wherein said user group information is an identification transmitted by said transceiver, said identification being correlated to said location register by a private translation table.

5. The mobile communication unit of claim 1, wherein said processor initiates transmission of said user group information to said one private wireless office system with which said transceiver is then communicating only upon receipt by said transceiver of a signal indicating that said one private wireless office system with which said transceiver is then communicating supports use by private system mobile communication units.

6. The mobile communication unit of claim 1, wherein said processor blocks transmission of said user group information to said one private wireless office system with which said transceiver is then communicating upon receipt by said transceiver of a signal indicating that said one private wireless office system with which said transceiver is then communicating does not support use by private system mobile communication units.

7. A communication system for a private system, comprising:
   first and second spatially separated private wireless office systems covering first and second areas;
   a mobile station having
      a transceiver communicating with said one of said first and second private wireless office systems covering one of said first and second areas in which said mobile station is located,
      a memory storing user group information relating to said mobile station, and
      a processor selectively initiating transmission by said transceiver of said user group information in said memory to said one private wireless office system covering said one of said first and second areas in which said mobile station is located;
   a private location register at a selected location storing access right information for said mobile station, said user group information identifying said selected location; and
   a communication network between said first and second private wireless office systems and said private location register.

8. The communication system of claim 7, wherein:
   said communication network is said Internet; and
   said user group information in said memory comprises said Internet address of said private location register.

9. The communication system of claim 7, wherein:
   said communication network identifies each private wireless office system by a Mobile Switching Center Identification (MSCID);

one of said first and second private wireless office systems has said private location register, and said user group information in said memory comprises said MSCID of said private location register.

10. The communication system of claim 7, further comprising translation tables at each base station mapping said user group information to said private location register storing access right information for said mobile station.

11. A method for registering a mobile station having a home private wireless office system with a visited private wireless office system, comprising the steps of:

transmitting user group information by said mobile station to said visited private wireless office system when initiating registration of said mobile station with said visited private wireless office system, said user group information identifying said home private wireless office system;

requesting information regarding service access of said group from a private location register of said home private wireless office system responsive to receipt of said user group information at said visited private wireless office system;

providing said information regarding service access of said group from said private location register of said home private wireless office system to said visited private wireless office system; and providing service access to said mobile station in said visited private wireless office system in accordance with said information regarding service access of said group.

12. The improved method of claim 11, wherein said step of requesting information regarding service access of said group from said private location register at said home private wireless office system comprises:

translating said user group information to said private location register; and accessing said information regarding service access of said group at said private location register of said home private wireless office system.

13. The method of claim 11, wherein transmitting user group information by said mobile station to said visited private wireless office system when initiating registration of said mobile station with said visited private wireless office system is done only if it is determined that said mobile station is not initiating registration with said home private wireless office system.

14. The method of claim 13, further comprising:

transmitting an indication by said visited private wireless office system that it supports communication with mobile stations registered with private system networks; and transmitting user group information by said mobile station to said visited private wireless office system when initiating registration of said mobile station with said visited private wireless office system is not done unless said mobile station receives said indication.

15. The method of claim 11, wherein transmitting user group information by said mobile station to said visited private wireless office system when initiating registration of said mobile station with said visited private wireless office system comprises transmitting a user group ID.

16. The method of claim 11, wherein:

said private location register is at an Internet address;

requesting information regarding service access of said group from said private location register comprises requesting information regarding service access of said group over the Internet from said Internet address; and providing said information regarding service access of said group from said private location register at said home private wireless office system to said visited private wireless office system comprises providing said information regarding service access of said group over the Internet from said Internet address.

17. The method of claim 11, said private location register is identified by a Mobile Switching Center Identification (MSCID); and requesting information regarding service access of said group from said private location register comprises addressing a request for information regarding service access of said group with said MSCID, and sending said request for information addressed with said MSCID to said private location register identified by said MSCID.

18. The method of claim 11, wherein:

said user group information is mapped in a translation table for identifying said home private wireless office system; and requesting information regarding service access of said group from said private location register comprises mapping said user group information on said translation table to identify said home private wireless office system, and requesting information regarding service access of said group from said private location register identified by mapping said user group information on said translation table.

19. A method of providing access for mobile station to a private wireless office system, the method comprising:

receiving a registration request from the mobile station at the private wireless office system, the registration request including information identifying a network location containing access rights information for the mobile station;

requesting verification of access rights of the mobile station from the identified network location;

receiving a response to the request for verification from the identified network location; and sending a registration response to the mobile station responsive to the received response to the request for verification.

20. A method according to claim 19, wherein the network location comprises one of a location register, a private wireless office system, or a mobile switching center.

21. A method according to claim 19:

wherein the information identifying a network location comprises user group information for the mobile station; and wherein requesting verification of access right comprises:

translating the user group information to a network address for the network location; and requesting verification of access rights of the mobile station from the network address.

22. A method according to claim 19, wherein receiving a registration request is preceded by transmitting an indication from the private wireless office system that it supports communication with mobile stations registered with private system networks.

23. A method according to claim 19, wherein the information identifying a network location comprises a user group ID.

24. A method according to claim 19, wherein the information identifying a network location comprises at least one of an Internet address and a mobile switching center identification.

* * * * *